Jan. 18, 1927.  
W. N. GILBERT  
1,614,726  
PENDULUM SCALE  
Filed Oct. 12, 1925  3 Sheets-Sheet 1

Jan. 18, 1927.

W. N. GILBERT

PENDULUM SCALE

Filed Oct. 12, 1925

Inventor
William N. Gilbert
By his Attorneys
Cooper, Kerr & Dunham.

Jan. 18, 1927. 1,614,726

W. N. GILBERT

PENDULUM SCALE

Filed Oct. 12, 1925  3 Sheets-Sheet 3

Patented Jan. 18, 1927.

1,614,726

UNITED STATES PATENT OFFICE.

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY.

PENDULUM SCALE.

Application filed October 12, 1925. Serial No. 61,928.

This invention pertains to automatic weighing scales of the pendulum type and has for its principal object the provision of a scale of that type which will not be thrown out of balance nor weigh inaccurately when the scale is out of level.

As is well known this has long been a difficult problem especially in scales of portable type which are frequently moved from place to place. The problem is solved in my present invention by the use of two similar pendulums so interconnected with each other and with the balance of the scale mechanism as to enable the scale to automatically maintain its adjustments and accuracy within all ordinary out of level conditions.

Another object of my invention is to provide a scale of such design as will be durable in service and maintain its adjustments over long periods of time.

Another object is to provide a simple and compact arrangement of load counterbalancing means which will lend itself readily to unit construction; that is, the load offsetting mechanism may be built as a complete compact unit in itself and later installed in a suitable casing or housing with only slight modification to fit it to a particular type or capacity of scale.

Further and other objects and advantages will be hereinafter set forth in the accompanying specifications and claims and shown in the drawings, which by way of illustration show what is now considered to be the preferred embodiment of the invention.

Figure 1:
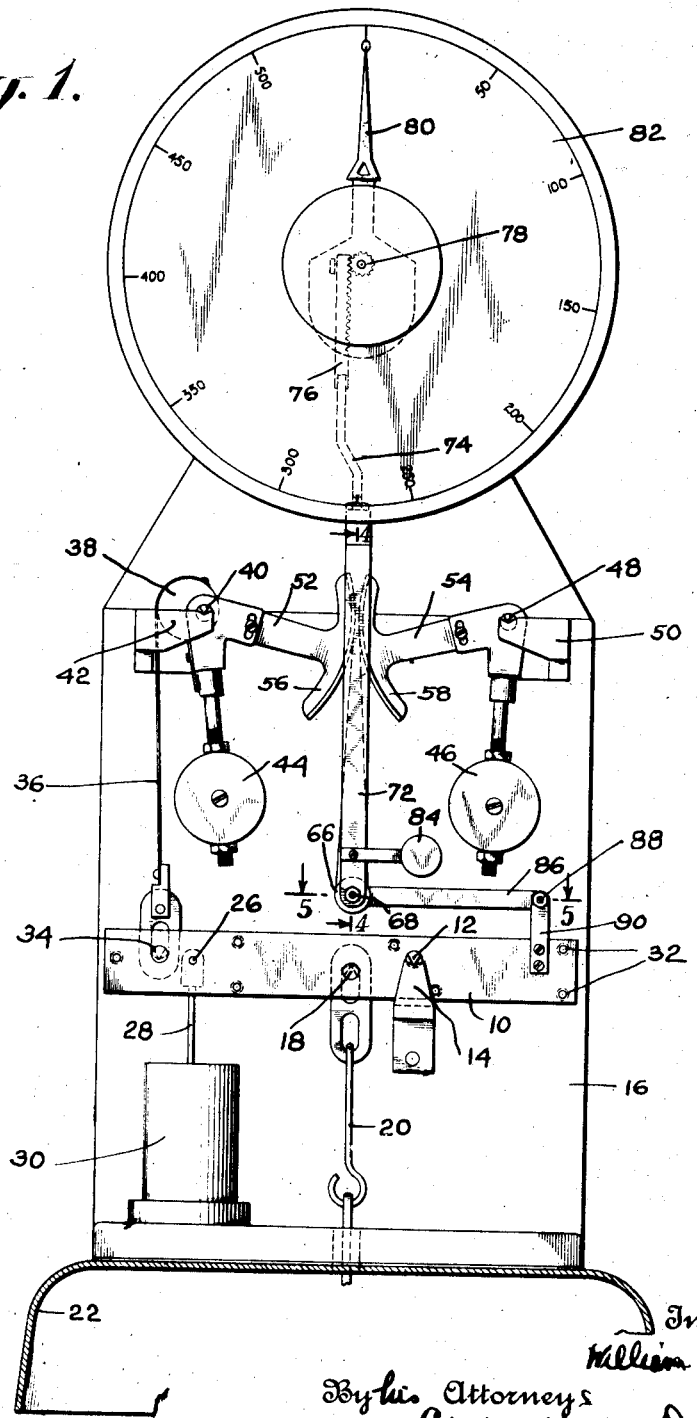
Fig. 1 is a front view of my design with outer casing removed.
Figure 3:
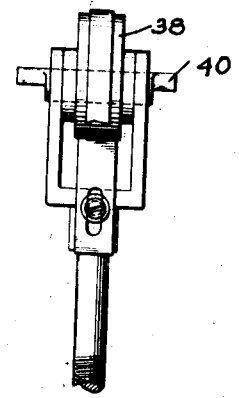
Fig. 3 is a detail of pendulum cam.

The main lever 10 has a fulcrum pivot 12 resting in fulcrum bearing 14 supported on frame 16. To the left of the fulcrum bearing is a load pivot 18 connected by steelyard rod 20 to the lever system contained within the base 22. The base levers are not shown as any system of levers suitable for use with automatic load offsetting devices may be used. The load receiving platform 24 is carried by the base levers.

Pivotally connected at 26 to lever 10 is the dash pot rod 28 provided at its lower end with a plunger working within the cylinder of dash pot 30 to dampen the vibration of the scale parts and bring them promptly to rest.

Lever 10 is formed of two similar side plates spaced apart and rigidly fastened together by studs 32.

Near the left end of lever 10 is a pivot 34 from which extends upwardly a tape or ribbon 36 which at its upper end passes partly around the circumference of cam 38 and is fastened thereto. Cam 38 is the well known device commonly used in pendulum scales to counterbalance for the angularity of the pendulum swing thereby permitting the charts or dials to be evenly graduated.

Figure 6:
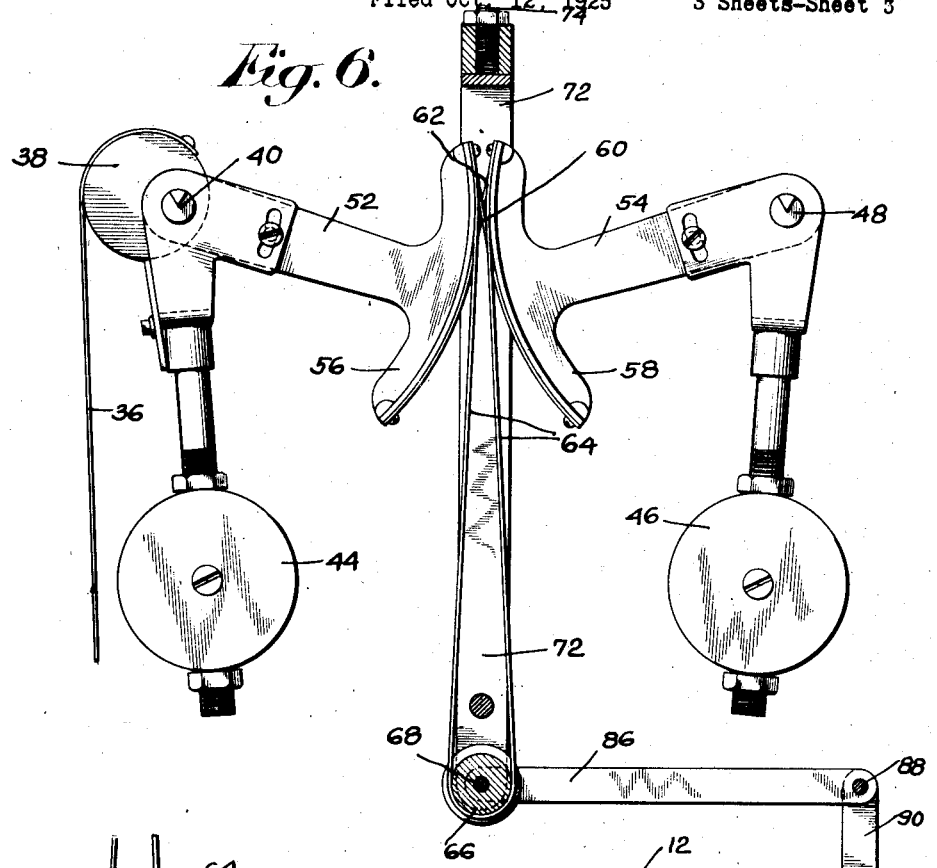
Fig. 6 is an enlarged view of the pendulums and connections.

Cam 38 is fast to pivot 40 which rests in fulcrum bearing 42 and carries left hand pendulum 44. On the right side of the machine a similar pendulum 46 has a pivot 48 supported in fulcrum bearing 50. Extending laterally towards the center of the machine from pivots 40 and 48 are the arms 52 and 54 respectively. Each arm is adjustably secured by a slot and screw device to its pendulum, but after adjustment each arm is in effect integral with its respective pendulum. Arm 52 terminates in an arcuate portion 56 and arm 54 has an exactly similar arcuate portion 58 (Fig. 6). The two arcuate portions 56 and 58 are in close proximity to each other and are operably connected by metal tapes or ribbons, the upper end of arc 56 being connected by tape 60 to the lower end of arc 58, and the upper end of arc 58 being connected to the lower end of arc 56 by tape 62. It will be readily understood that this construction provides a positive, frictionless connection between pendulums so that if either pendulum swings on its pivot the other will swing an exactly similar amount in the opposite direction. If one pendulum swings towards the center of the machine the other will also swing towards the center an exactly similar distance and if one swings outwardly the other will also swing outwardly the same amount.

Figure 4:
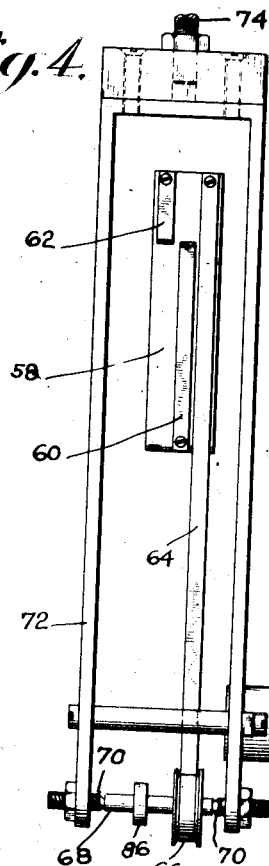
Fig. 4 is a sectional view on line 4—4 of Fig. 1.
Figure 2:
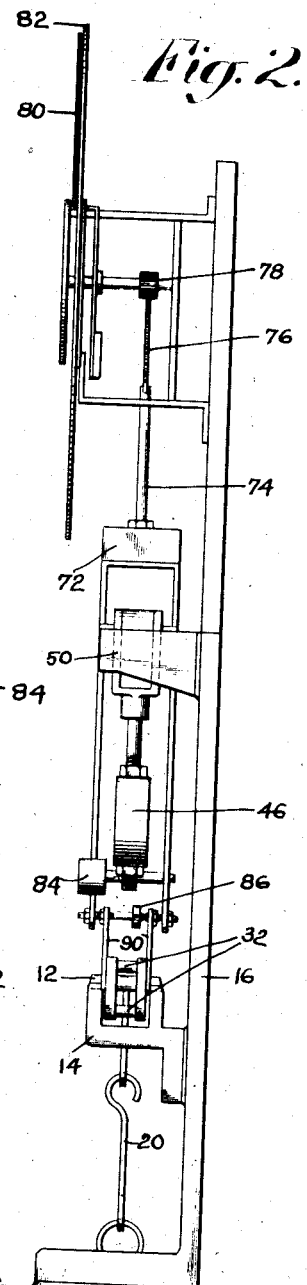
Fig. 2 is a side view of Fig. 1 taken from the right.
Figure 5:
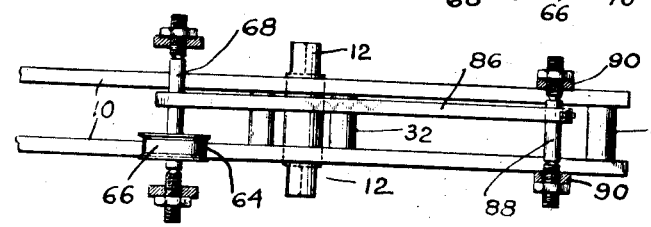
Fig. 5 is a sectional view on line 5—5 of Fig. 1.
Figure 5:
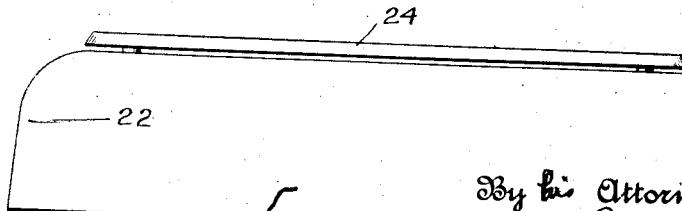

Hanging downwardly from the arcuate surfaces 56 and 58 is the loop of tape 64, one of the upper free ends of the loop being secured to the upper end of arc 56 and the other to the upper end of arc 58. Resting in the loop at the lower end of 64 is the roller 66 (Figs. 4 and 6) fast on shaft 68, the ends of which are mounted in antifriction bearings 70 in vertical yoke 72 bearing on its upper end the vertical rack rod 74. On the upper end of rod 74 is secured the rack 76 in mesh with pinion 78 which in the usual manner turns indicator 80 to indicate on chart or dial 82 the weight of the load on the platform. The lower end of yoke 72 is provided with the usual offset weight 84 to keep rack 76 gently enmeshed with pinion 78.

Figure 7:
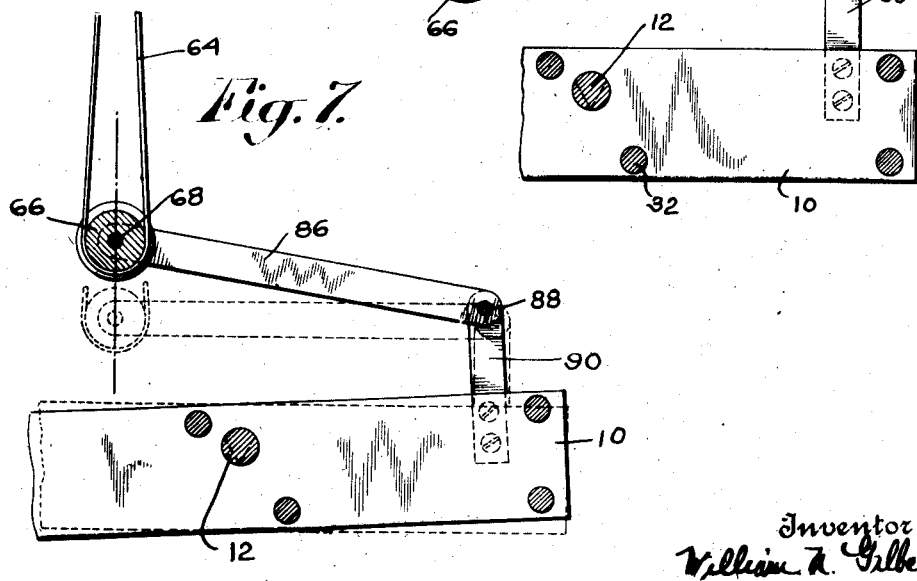
Fig. 7 is an enlarged view of a portion of main lever and rack rod check device.

To guide the lower end of yoke 72 in a vertical path a check link 86 is provided with one end fast to shaft 68 and the other fast to shaft 88 mounted in antifriction bearings in the bracket 90 rigid with lever 10 and projecting upwardly therefrom. The position of bracket 90 and its length are so proportioned with relation to length of link 86 and location of pivot 12 that shaft 68 travels in a vertical line as indicated in Fig. 7.

In operation, when a load is placed on platform 24 steelyard rod 20 is drawn down, lever 10 is swung counter-clockwise about its fulcrum pivot 12 and tape 36 is drawn down. The drawing down of tape 36, acting through the instrumentality of cam 36 swings pendulums 44 and 46 equal amounts towards the center of the machine until they have acquired sufficient leverage measured horizontally from their respective pivots 40 and 48 to counterbalance the load, and at those points they come to rest. This swinging of the pendulums has raised their arcuate members 52 and 54 and, with them, yoke 72 and rack 76 resulting in pinion 78 being rotated and causing indicator 80 to point out on chart 82 the amount of the load. When the load is removed the pendulums and other moving parts will return to normal position and the indicator will again indicate zero.

If the machine is shifted to an "out of level" position it will be evident that the effective leverage of one pendulum will be increased and the leverage of the other decreased, the leverage being measured horizontally from their respective pivots, but since the two pendulums are exactly similar, move in opposite directions, and are located symmetrically with reference to the center line of the machine, one pendulum will gain the same amount of leverage as the other loses. Therefore, since the pendulums are interconnected by frictionless means, they will assume the same positions in counterbalancing any given load whether the scale is level or out of level, provided only that the machine is not so far out of level as to permit working parts to become displaced from their true positions sufficiently to cause friction.

Any disturbing effect on the weighing operations due to the indicating devices under out of level condition is obviated by the fact that the rack rod and the parts which actuate it are all on the center line of the machine.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is—

1. In a machine of the class described, weight indicating devices in combination with load counterbalancing means comprising a pair of oppositely disposed pendulums, and frictionless means for directly interconnecting said pendulums and constraining said pendulums to operate in harmony.

2. The invention set forth in claim 1 in which said frictionless means comprises arcuate portions of the pendulum structure and tapes cooperating therewith.

3. In a machine of the class described, weight indicating devices in combination with load counterbalancing means comprising a pair of oppositely disposed pendulums, said pendulums being provided with integral arcuate members, said arcuate members being circumferentially adjacent and operably interconnected by frictionless means which constrains said pendulums to operate in harmony.

4. In a machine of the class described, weight indicating devices in combination with load counterbalancing means comprising a pair of oppositely disposed pendulums, said pendulums being provided with integral arcuate members, said arcuate members being substantially tangent to each other and being interconnected by crossed tapes, one of which extends from the upper portion of each arcuate surface to the lower portion of the other arcuate surface.

5. In a load counterbalancing and indicating mechanism for an automatic scale, in combination, a pair of oppositely disposed pendulums, frictionless means for interconnecting said pendulums and constraining said pendulums to operate in harmony, an indicator operating device, and frictionless means for interconnecting said pendulums and said indicator operating device.

6. In a load counterbalancing and indicating mechanism for an automatic scale, in combination, a pair of oppositely disposed pendulums, frictionless means for interconnecting said pendulums, an indicator operating device, and frictionless means for interconnecting said pendulums and said indicator operating device, said last mentioned interconnecting means comprising a tape depending from said pendulums.

7. In an automatic scale, in combination with a pair of similar oppositely positioned pendulums having arcuate members, frictionless devices constraining said pendulums to operate in harmony, a vertical rack supporting yoke, and frictionless means interconnecting said yoke and said arcuate members and supporting said yoke for vertical movement.

8. In an automatic scale in combination with a beam, an indicator, a pair of oppositely disposed pendulums, an arm extending laterally from each pendulum towards the center of the machine, an arcuate member on the end of each of said arms, said members being substantially tangent to each other, means comprising tapes for operating interconnecting said members, a vertical indicator operating member supported for vertical movement by tape means from said arcuate members, and means interconnecting said beam and said indicator operating member to guide the lower end of said member for movement in a substantially vertical path.

9. The invention set forth in claim 8 in which said last mentioned means comprises a substantially horizonal link interconnecting said indicator operating member and an offset portion of said beam.

10. In an automatic scale, in combination, a chart, an indicator, a beam having a load pivot, a pair of oppositely disposed pendulums having interconnected arcuate members, a vertical rack member supported from said arcuate members, and operative connections between said beam and said pendulums, said indicator, load pivot and rack member being substantially in the central vertical plane of the machine and the arcuate portions of said pendulums being substantially tangent to said plane.

In testimony whereof I hereto affix my signature.

WILLIAM N. GILBERT.